Oct. 15, 1935.  R. LAPSLEY  2,017,101
TRANSMISSION
Filed June 29, 1931  3 Sheets-Sheet 1

Inventor
Robert Lapsley
By Brown Jackson Boetlens
Dinner Attys.

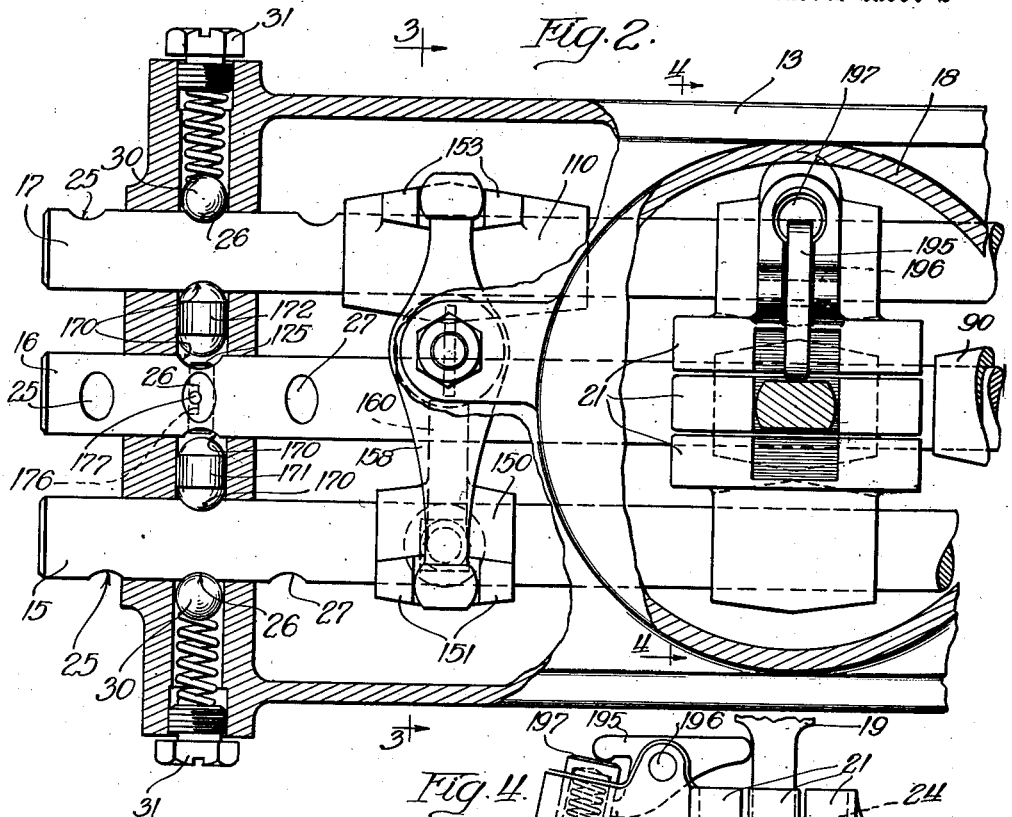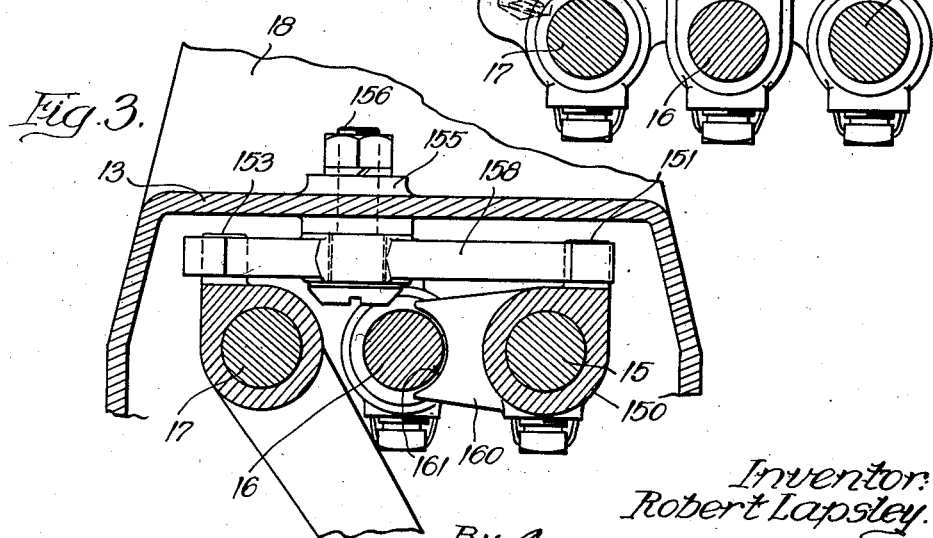

Oct. 15, 1935.  R. LAPSLEY  2,017,101
TRANSMISSION
Filed June 29, 1931   3 Sheets-Sheet 3
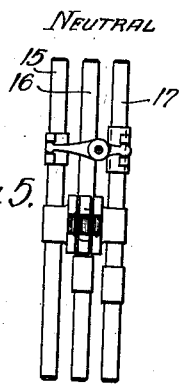
Fig. 5. Neutral
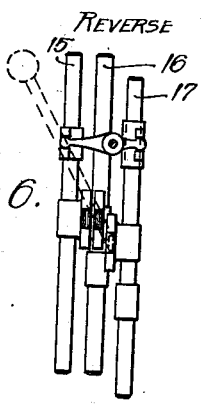
Fig. 6. Reverse
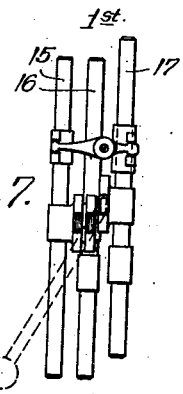
Fig. 7. 1st.
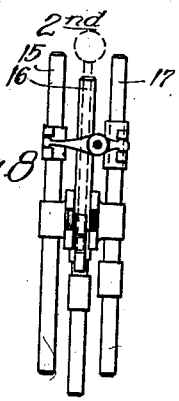
Fig. 8. 2nd
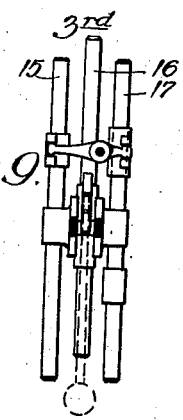
Fig. 9. 3rd
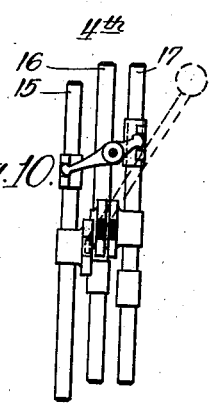
Fig. 10. 4th
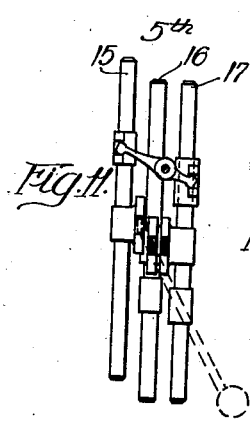
Fig. 11. 5th
Fig. 12.
Fig. 13.
Inventor:
Robert Lapsley Patented Oct. 15, 1935.

2,017,101

UNITED STATES PATENT OFFICE 2,017,101

TRANSMISSION

Robert Lapsley, Berrien Springs, Mich., assignor to Clark Equipment Company, Buchanan, Mich., a corporation of Michigan Application June 29, 1931, Serial No. 547,576

11 Claims. (Cl. 74—473)

The present invention relates generally to transmissions for automobiles and other vehicles and is particularly concerned with an improvement in the change speed gearing and the supporting means therefor, and particularly a new and improved shifting means for effecting the various gear changes.

More specifically, the present invention has for its principal object the provision of a change speed transmission, preferably including an over drive, having five forward speeds and reverse and which is so constructed and arranged that a compact and sturdy construction is obtained wherein the shifting mechanism for the various gear or speed changes is so arranged that the sequential operation thereof is substantially the same as the customary three- or four-speed transmission in use to-day. The principal advantage arising from the feature just mentioned is that an orderly progression of movements of the gear shift lever is obtained in passing successively through the various gear changes. It is also an important object of the present invention to incorporate the above advantages in a transmission where the fifth or highest forward speed is an over-drive, that is, the speed of the driven shaft of the transmission is stepped up above the speed of the driving shaft.

Heretofore in transmissions of the above described general type there has been a distinct interruption or abrupt change in the progression of the movements of the gear shift lever in entering and leaving the various shift positions so that the operation of the automobile in effecting the various gear changes was unnatural and required considerable attention on the part of the operator in order to correctly follow through the proper sequence in going from one speed to another, this disadvantage arising principally because the movements of the gear shift lever did not follow one another in an orderly progression and was somewhat dissimilar from the usual or standard shift employed at the present time.

Other objects and advantages resulting from the various structural features of the transmission which has been chosen for the purpose of illustrating the principles of the present invention will be apparent to those skilled in the art after a following detailed description of the preferred embodiment, taken in conjunction with the accompanying drawings, in which:

Figure 2 is an enlarged fragmentary view taken along the line 2—2 of Figure 1, with part of the housing broken away and showing a portion of my improved shifting mechanism;

Figure 3 is a sectional view taken along the line 3—3 of Figure 2 and also showing a portion of the improved shifting mechanism;

Figure 4 is a cross section taken substantially along the line 4—4 of Figure 2 showing shift restraining means for low speed and reverse;

Figure 1:
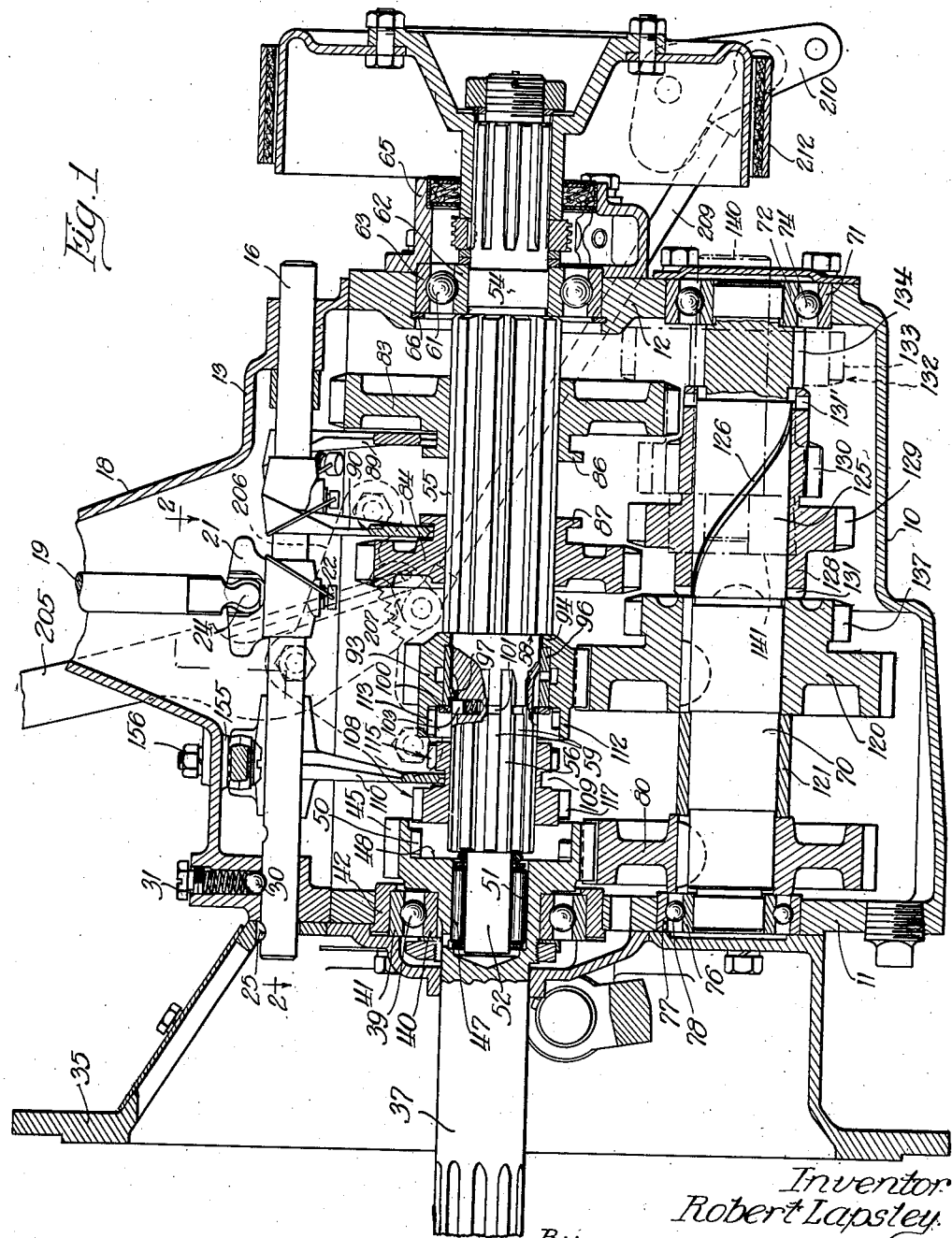
Figure 1 represents a cross-section through a transmission incorporating the various structural and functional improvements of the present invention.

Figures 5 to 11, inclusive, are fragmentary views showing the various positions of the shift rods and the gear shift lever corresponding to the various gear changes;

Figure 12 is a diagrammatic sketch showing the uniform progressive movement of the gear shift lever in effecting the various gear changes in sequence; and Figure 13 is a diagrammatic sketch corresponding to Figure 12 but illustrating the non-uniform movement of the upper end of the gear shift when my motion reversing mechanism is omitted.

Referring now more particularly to Figure 1, the reference numeral 10 indicates the gear box or transmission housing having a front wall 11, a rear wall 12 and a top cover plate 13 carrying the shift rods 15, 16 and 17 and a pedestal or upstanding boss 18 in which the gear shift lever 19 is mounted for universal movement. Each of the shift rods 15, 16 and 17 is provided with a lug or yoke 21 secured thereto in any manner desired, as by a set screw 22, and with which the lower end 24 of the gear shift lever is adapted to be selectively engaged. Preferably, the lower end 24 is narrowed by milling away a portion on opposite sides and also rounded to facilitate operating the shift rods and moving into and out of engagement with the various yokes or lugs 21. Each of the shift rods is slidably mounted in the housing or cover plate and is movable to various positions corresponding to the different gear changes as will be more clearly explained hereinafter. In order to hold the shift rods 15, 16 and 17 in their various positions, each is provided with a number of recesses or depressions 25, 26 and 27 in which a spring pressed ball 30 is adapted to be received, as is well understood in the art. The tension of the springs cooperating with the balls 30 may be adjusted by screw means 31. For reasons of structural and manufacturing expediency the described retaining means for the shift rods 15 and 17 are arranged in a horizontal position while the retaining means for the central shift rod 16 is arranged in a vertical position, as best shown in Figure 1. This may, of course, vary.

The forward wall 11 of the transmission housing 10 carries a clutch or bell housing 35 which is adapted to enclose the usual operating clutch (not shown) which when engaged drives the driving shaft 37 journaled in the forward portion of a transmission housing 10, preferably by ball bearing means including anti-friction balls 39, an inner race 40 and an outer race 41, the latter being carried in a collar 42 secured in any manner desired to the front wall 11 of the housing 10.

The rear end of the driving shaft 37 is provided with a driving gear 45 which may be separately formed and keyed or otherwise secured to the driving shaft 37 but preferably is formed integrally therewith as shown in Figure 1. From this figure it will be observed that the driving shaft 37 and the driving gear 45 are provided with a pair of axial bores 47 and 48, the latter having a plurality of teeth 50 for a purpose to be described later and the former having mounted therein roller bearing means 51 receiving and supporting the forward reduced end 52 of the driven shaft 54.

The driven shaft 54 is provided with a splined portion 55 having a diameter greater than the splined portion 56 forward of the splined portion 55, as best shown in Figure 1. Between these portions a shoulder 58 is provided, and the splines 59 of the portion 56 may be extended rearwardly to a point near or at the shoulder 58. As just described, the forward end of the driven shaft 34 is supported within the bore 47 of the driving shaft 37 while the rear end of the driven shaft 34 is carried by ball bearing means mounted in the rear wall 12 of the transmission housing 10. This ball bearing means includes a plurality of anti-friction elements 61 operating between an inner race 62 and an outer race 63, the former being secured to the driven shaft 54 while the outer race 63 is fixedly mounted in the rear wall 12 of the transmission housing. The means for retaining the stationary race 63 in position may take any convenient form, but preferably in the illustrated embodiment this means comprises a hub 65 bolted to the rear wall 12 and receiving in abutting engagement the stationary race 63, the latter abutting against a spring ring 66 mounted in a suitably formed groove in the rear wall 12. The bearing means 61—63 is of well known construction and is adapted to take both radial and axial loads.

A countershaft or secondary shaft 70 is journaled in the lower part of the transmission housing 10 by ball bearing means similar to that just described in connection with the driven shaft 54. The ball bearing means at the end of the countershaft or secondary shaft 70 is seen to comprise a stationary race 71 mounted in the rear wall 12 of the transmission housing, an inner race 72 having a pressed fit onto the rear reduced end of the countershaft 70, and a plurality of anti-friction balls 74 operating between the inner and outer races in the usual manner. The ball bearing means for the forward end of the countershaft 70 comprises the inner race 76 secured to the forward reduced end of the countershaft 70, the outer race 77 mounted in the forward wall 11 of the transmission housing 10, and a plurality of anti-friction balls 78 operating between the races 76 and 77. Both the bearing means just described are capable of taking axial and radial loads.

Coming now to the gear means or gear connections whereby five forward speeds and reverse is obtained, it will be noted that the driving gear 45 on the driving shaft 37 is in mesh with and drives a driven gear 80 keyed onto the countershaft 70 near the forward end thereof. By this means, therefore, the countershaft 70 is driven at all times with the driving shaft 37. The larger splined portion 55 of the driven shaft 54 carries two gears 83 and 84 thereon, these gears being slidable axially of the driven shaft 54 but constrained by their splined engagement therewith to rotate the shaft. Each of the gears 83 and 84 carries a grooved hub, 86 and 87, respectively, with which shift forks 89 and 90 are engaged. Shift fork 89 is fixedly secured to the rear end of the shift rod 17 while the shift fork 90 is fixedly secured to the shift rod 16. A floating or freely rotatable gear 93 is journaled on the portion 56 of the driven shaft 54 just forward of the shoulder 58. The gear 93 carries an inwardly extending radial flange 94 which abuts directly against the shoulder 58 so that any axial thrust thereof is transmitted directly to the driven shaft 54 and to the bearing means 61—63. The floating gear 93 rotates on a bushing 96 which rotates with the driven shaft 54. Preferably, the bushing 96 has one or more keys 97 engaging the splines 59, and the rear end of the bushing 96 is arranged to abut against the flange 94 so as to hold the gear 93 up against the shoulder 58.

The bushing 96 is itself held in position by a toothed washer or lock ring 100 which is passed over the splined portion 56 of the driven shaft 54 until it abuts against the bushing 96, whereupon the ring or washer 100 is then given a slight rotational displacement so that the teeth thereof, operating in a circumferential groove 101 established by interruptions in the splines 59, occupy positions behind the splines 59. When thus in proper position, a spring pressed plunger 103 radially movable in the driven shaft 54 moves outwardly to a position between adjacent teeth on the toothed washer or ring 100, thus effectively holding the latter in place and thereby retaining the bushing 96 and the associated gear 93 in proper position on the driven shaft 54.

A sliding clutch hub or dog 108 is mounted just forward of the floating gear 93, and is provided with a shift groove 109 which is engaged by a shift fork 110. The shift fork 110 is itself slidable on the shift rod 17 which controls the movements of the gear 83 at the rear end of the driven shaft 54. The gear 93 has a forward hub 112 with interior teeth 113 formed therein which are adapted to be engaged by the teeth 115 on the rear end of the slidable hub or dog 108. The forward end of the hub 108 is also provided with teeth 117, and these latter teeth are adapted to engage the teeth 50 formed interiorly of the axial bore 47 in the driving gear 45. When the sliding hub 108 is shifted forwardly the driving shaft 37 is connected directly with the driven shaft 54 and when the sliding hub 108 is shifted rearwardly, the floating gear 93 is connected to rotate with the driven shaft 54.

The countershaft carries a number of gears with which the gears 83, 84 and 93 on the driven shaft 54 are adapted to cooperate. A large gear 120 is keyed onto the countershaft 70 and is spaced from the driven gear 80 by means of a sleeve 121. The large gear 120 is in constant mesh with the gear 93 on the driven shaft 54, and preferably these two gears have helical teeth so that quietness in operation is attained. The use of helical gears, however, causes a certain amount of axial thrust, but in the present construction this is taken care of by the abutting relation between the floating gear 93 and the driven shaft 54 whereby the bearing means 61—63 effectively resists the axial thrust of the gear 93, while the thrust of the gear 120 is transmitted by the sleeve 121 directly to the driven gear 80 and to the inner race 76 of the bearing means 76—78.

The rear end of the countershaft 70 is provided with a cylindrical bearing portion 125 having an oil groove 126 and upon which is journaled a compound or double gear 128 having two gear portions 129 and 130 of different diameters. Lubricant in the housing or casing 10 reaches the oil groove 126 through openings or interruptions 131 in the hub of the gear 128. The compound gear 128 is rotatable with respect to the countershaft 70 but is driven by the countershaft through a compound or double gear 132, the larger end 133 of which is in constant mesh with a small gear 134 secured to or formed integrally with the countershaft 70. The other end of the compound or double gear 132 is in mesh with and drives the gear 130 on the compound gear 128 rotatable on the countershaft 70. Due to the difference between the size of the gears 133 and 134 it is to be observed that as the countershaft 70 is rotatable the double gear 132 will be rotated thereby but at a slower speed and this will, in turn, drive the compound gear 128 at a rate of rotation less than that of the countershaft 70.

The gear 129, as will be observed from Figure 1, is also a double gear, the smaller portion of which is indicated by the reference numeral 137. In the drawings the gear 137 is substantially the same diameter as the gear 129, but it must be remembered that gear 137 is keyed and rotates with the countershaft 70 while the gear 129 is rotated at a speed somewhat slower than the countershaft 70. The gear 84 on the larger splined portion 55 of the driven shaft 54 occupies a position intermediate the gears 129 and 137, and the gear 84 is shiftable to two positions, one in which the gear 84 meshes with the gear 137, the other position being one in which the gear 84 meshes with the gear 129. The gear 83, the largest gear on the driven shaft 54, is adapted to mesh with the small gear 130 of the compound gear 128 in one position, while in another position the gear 83 is adapted to mesh with the gear 133 of the compound gear 132. The latter, which thus acts as a reverse idler, is journaled upon a shaft 140 mounted in any manner desirable in the rear wall 12 of the housing and a bracket or boss 141 formed on one side of the transmission housing 10.

The operation of the above described gear connections for the various speed changes is as follows: Shift fork 89 is movable rearwardly to engage the gear 83 with the reverse idler 133 to effect reverse drive. When the shift fork 89 is moved forwardly the gear 83 meshes with the gear 130 constantly driven with but at a slower speed than the countershaft 70 to effect low or first speed. To effect second speed the shift fork 90 is moved rearwardly to shift the gear 84 into engagement with the larger gear 129 on the slowly rotatable compound gear 128. To effect third speed the shift fork 90 is movable forwardly to engage the gear 84 with the smaller gear 137 keyed directly to the countershaft 70. To effect fourth speed or direct drive the shift fork 110 is moved forwardly to engage the teeth 108 with the teeth 50 formed on the driving gear 45, thus directly connecting the driving shaft 37 with the driven shaft 54, and to effect fifth speed or over drive the shift fork 110 is moved rearwardly to engage the teeth 115 with the teeth 113 of the floating gear 93, thereby connecting the gear 93 with the driven shaft 54, the drive then being from the driven gear 45 to the driven gear 80 through the countershaft 70 to the helical gear 120 and thence through the helical gear 93 to the driven shaft 54.

It is to be noted that each of the shift forks 89 and 90 control two of the gear changes, and each fork is movable rearwardly to engage the lower of the two speeds controlled thereby, whereas the shift fork 110 is moved forwardly in order to establish the lower of the two gear changes which it controls. The shift forks 89 and 90 are directly connected to the corresponding shift rods, 17 and 16, respectively, but if an orderly progression of movement of the gear shift lever 19 is to be attained the shift fork 110 cannot be directly connected to its shift rod 15. It is, therefore, slidably mounted on the shift rod 17 and connected with its actuating shift rod 15 through a motion reversing mechanism so that the gear shift lever 19 in establishing fourth speed or direct drive may be moved in the same direction in which it is moved when establishing reverse or second speed, which corresponds respectively to the lower speed for any particular lateral position of the gear shift lever.

The reversing mechanism for achieving this result is as follows: All of the shift rods 15, 16 and 17 are slidably mounted in the cover 13 in closely spaced relation. Shift rod 15 carries a collar 150 fixed thereto and provided with a pair of upstanding ears 151. As described above, the shift fork 110 is slidable on the shift rod 17, and the shift fork 110 carries also a pair of upstanding ears 153. The cover plate 13 is provided with an apertured boss 155, best shown in Figure 3 and the boss 155 carries a pivot stud or bolt 156 upon which a rocker arm or lever 158 is pivoted. The arm or lever 158 is thus fulcrumed about a central point for swinging movement about a vertical axis. The ends of the lever 158 are rounded as best shown in Figure 2 and these ends are received respectively between the ears or lugs 151 and 153.

The collar 150 carries a laterally projecting web 160 having an arcuate recess 161 which embraces the adjacent shift rod 16 for the purpose of preventing accidental angular displacement or rotation of the shift rod 15, the other rods 16 and 17 having shift forks 89 and 90 which serve this purpose.

With reference to the operation of this motion reversing mechanism, whenever the gear shift lever 19 is shifted laterally to a position to engage the lug 21 on the shift rod 15 and is then given a movement to move the shift rod rearwardly, which corresponds in direction to moving either of the shift rods 16 and 17 rearwardly to effect the lower of the gear changes controlled respectively by said shift rods, the lever 158 is swung in a counter clockwise direction as viewed in Figure 2, thus shifting the shift fork 110 forwardly and thereby engaging the driving and driven shafts for direct drive, which is the lower of the two gear changes controlled by the shift fork 110 and the slidable clutch dog 108.

Correspondingly, when the shift rod 15 is moved forwardly, which calls for a movement of the gear shift lever 19 corresponding to the movement of the gear shift lever in either of its other two lateral positions when it is desired to effect the higher of the drives controlled by the gear shift lever in that lateral position, the lever 158 is swung in a clockwise direction and shifts the shift fork 110 and the hub 108 rearwardly thus connecting the helical gear 93 to the driven shaft 54 whereby the fifth speed or over drive is established. Therefore, were it not for the reversal of movement between the shift rod 15 and the shift fork 110 controlled thereby there would be a distinct interruption or break in the successive movements of the gear shift lever in going from third to fourth speed. Figure 13 illustrates the movement of the upper or operating end of the gear shift if the shift fork 110 were directly connected to its shift rod 15 while Figure 12 shows the orderly progression of movements of the gear shift lever obtained by the use of my novel motion reversing mechanism.

Figures 5 to 11, as well as Figure 12, show the operation or movements of the gear shift lever in detail. Figure 5 shows the relation of the parts when the gear shift lever is in neutral, while Figures 6 to 11 show the position of the parts in various speeds including reverse. As there shown, for reverse drive, the upper or outer end of the gear shift lever is moved laterally to the left and then forwardly; for first or low speed drive the gear shift lever is moved directly rearwardly; for second speed the gear shift lever is moved forwardly to neutral and then laterally to the right one step and then forwardly; for third speed the gear shift lever is moved in this lateral position directly rearwardly; for fourth speed or direct drive, the gear shift lever is moved forwardly to neutral and then to the right to its second lateral position and then forwardly; and lastly fifth speed or over drive the gear shift lever is moved directly rearwardly. These various movements are diagrammatically illustrated in Figure 12 from which it will be seen that the movements of the gear shift lever are made in the usual manner and follow one another in a natural and orderly sequence or progression.

In order to prevent the accidental displacement of any of the shift rods when one of them is in operative position I provide a form of latch or lock means best shown in Figure 2. As there shown each of the adjacent or contiguous surfaces of the shift rods 15, 16 and 17 is provided with a small recess, designated generally by the reference numeral 170. When the shift rods 15, 16 and 17 are in neutral, these recesses occupy a position in line with the bore joining the horizontally arranged spring pressed balls 30. Two plungers 171 and 172 are arranged in this bore and are provided with rounded ends cooperating with the recesses 170 in the shift rods. Each of the plungers 171 and 172 is so dimensioned in length that movement of either of the associated shift rods out of neutral position will project the associated plunger into the recess formed in the adjacent shift rod.

If, for example, the intermediate shift rod 16 were actuated both plungers 171 and 172 would be displaced outwardly and enter the recesses 170 in the shift rods 15 and 17 and occupy the position in which they are shown in full lines in Figure 2. Thus when shift rod 16 is moved out of its neutral position both of the other shift rods, 15 and 17, are held in locked engagement with the transmission housing whereby their accidental displacement is prevented. If either one of the shift rods 15 or 17 is actuated the corresponding plunger 171 or 172 will be displaced and enter the recess 170 in the shift rod 16, thus locking that shift rod in neutral. In order, however, to have both of the other two shift rods locked when either shift rod 15 or 17 is moved, the following mechanism is provided.

The central shift rod 16 is provided with a transverse bore joining its recesses 170, and a pin 175 is mounted for limited sliding movement in this bore. A slot 176 is formed in the pin 175 to receive a small stud 177 which is formed to cooperate with the slot 176 for holding the pin 175 in place. Thus movement of the shift rod 15 out of its neutral position will lock the shift rods 16 and 17, and movement of the shift rod 17 will lock the rods 15 and 16 in a similar manner.

In order to prevent the inadvertent operation of the first speed and reverse shift rod when it is actually not desired to use either of these gear speeds, it being understood that in a transmission of the above described type reverse is relatively seldom employed and particularly where more than three forward speeds are provided, it is customary to operate in the first speed only in cases where the vehicle is ascending a very steep hill or otherwise in rough going, restraining means is provided. Under normal operative conditions it is seldom, if ever, necessary to go into first speed, and hence in a transmission of this type where both the reverse and low speed gear changes are controlled by one shift rod it is particularly desirable to provide a mechanism which imposes an appreciable restraining force on the gear shift lever when it is operated in a manner tending to move it into engagement with the low speed and reverse shift rod. The purpose of the restraining force is principally to call the attention of the operator to the fact that he is shifting gears into low speed or into reverse and hence will prevent inadvertent operation when it is not desired to engage the low speed or reverse gears. However, should the operator actually intend to shift the gear shift lever into low speed or reverse, he may do so by exerting sufficient additional force to overcome the initial resistance of the restraining or latch mechanism.

Therefore, in combination with the present transmission, I have shown a snap or restraining mechanism mounted on the shift rod 17 which controls the low speed and reverse gear changes, as will be best understood from Figures 2 and 4. The yoke or lug 21 for the shift rod 17 is arranged to pivotally carry a snap lever 195 on a pivot pin 196. When in normal position, as shown in Figure 2, the snap lever 195 is located so that it overlies the slot in the lug or yoke 21 on the shift rod 17 whereby the snap lever is in the path of movement of the gear shift lever 19 so as to tend to prevent the same from entering into engagement with the shift rod 17. A spring pressed plunger 197 holds the snap lever 195 in its normal position, the spring 198 being received within a recess formed in a boss on the lug or yoke 21 in which the plunger 197 is movable. A projection 199 on the snap lever 195 is adapted to rest against the side of the plunger 197, thus definitely limiting the upper motion of the plunger 197 whereby the snap lever 195 is held in a predetermined position relative to gear shift lever 19. As best shown in Figure 3, this normal position of the snap lever 195 is almost, but not quite, perpendicular to the gear shift lever 19. Thus when the gear shift lever is moved against the snap lever 195 the lever arm of the applied force tending to swing the snap lever upwardly is very short at the beginning of the upward movement of the snap lever. However, as soon as the lever 195 swings upwardly this lever arm is materially increased so that once the resistance to moving the gear shift lever into engagement with the shift rod 17 is overcome, the shift may be completed without any further noticeable resistance. As stated above, this is an important feature in connection with the particular type of transmission disclosed where the reverse and low speed gear changes are seldom employed as compared with the number of times the other gear changes are utilized.

In order that my improved transmission may be arranged for installation in vehicles and the like, I mount a brake operating lever 205 on the transmission housing 10 to which is also secured a latch segment 206 with which the latch pawl 207 cooperates in the usual manner. A link 209 connects the brake lever 205 with the crank 210 which contracts the emergency or parking brake 212.

While I have shown and described a particular transmission with the various features utilized in combination therewith it is to be understood that the principles of the present invention may be employed in structures differing widely from that shown and described.

What I claim, therefore, and desire to secure by Letters Patent is:—

1. Gear shifting mechanism comprising a shift lever, three gear shifting rods having lugs adapted for selective engagement by said shift lever, gear shifting forks carried by two of said rods, one of said forks being slidable on the rod, and means connecting the slidable fork with the third shift rod.

2. Gear shifting mechanism comprising a shift lever, three gear shifting rods having lugs adapted for selective engagement by said shift lever, gear shifting forks for the rods, one being fixedly secured to each of two of said shift rods and a third fork movably mounted with respect to the third shift rod, and means including a motion reversing lever having a fixed fulcrum and connecting the third shift rod with said third shift fork.

3. Gear shifting mechanism comprising a shift lever, three gear shifting rods having lugs adapted for selective engagement by said shift lever, gear shifting forks for the rods, one being fixed to each of two of said shift rods and a third fork being movably mounted on one of said two rods and operatively connected with the third shift rod, and shift restraining means for said shift lever, opposing movement of the shift lever toward engagement with said one shift rod with a variable decreasing force.

4. Gear shifting mechanism for transmissions comprising a gear shift lever, three gear shifting rods having yokes adapted to be selectively engaged by said gear shift lever, gear shifting forks for the rods, one being rigidly secured to each of two of said rods and another fork being slidably mounted on one of said rods, and motion reversing means connecting said other fork with the third shift rod and comprising a lever of the first class.

5. Gear shifting mechanism for a change speed gearing comprising selectively operated gear connections for effecting reverse drive and first, second, third and fifth speeds, and a slidable member for effecting fourth speed and for completing the gear connection for fifth speed, said gear shifting mechanism comprising three slidably mounted shift rods, a gear shift lever for moving said rods, two of said rods connected with the gear connections for reverse, first, second, and third speeds, a shift fork connected with the slidable member and movably mounted independently of the third shift rod, and motion reversing linkage disposed between the third shift rod and said shift fork and having pivotal connection with the third shift rod and said shift fork, whereby the movements of said shift lever are progressively uniform from reverse through first to fifth speeds.

6. Gear shifting mechanism in a transmission for automobiles affording five speeds forward and reverse and including a housing, axially aligned driving and driven shafts journaled therein, a countershaft, gears of different ratio on the countershafts, and mechanism including three selectively operable gear means splined on the driven shaft and cooperating with said gears to effect said speed changes, said gear shifting mechanism comprising three shift rods connected respectively with said gear means, two of said rods movable rearwardly to effect one speed change and forwardly to effect the next adjacent speed change in the series, the third shift rod being movable forwardly to effect one speed change and rearwardly to effect the next speed change in the series, and vice versa, a gear shift lever, and means including reversing mechanism connecting the lever with said rods whereby the lever is movable in all cases forwardly to effect certain speed changes and rearwardly to effect the next adjacent higher speed changes, the movements of said gear shift lever being thereby an orderly progression for effecting all of said speed changes in uniform sequence.

7. Gear shifting mechanism for a transmission comprising a driving shaft, a driven shaft, a countershaft, gear means connecting the driving shaft and the countershaft including a shiftable clutch hub splined on the driven shaft and optionally engageable with certain of said gear means and with the driving shaft, said gear shifting mechanism comprising shift mechanism for controlling the gear means and the shiftable clutch hub including a plurality of shift rods, and means movably mounted on one of said rods and connected to be moved by but opposite to another shift rod for shifting said clutch hub.

8. Gear shifting mechanism for a transmission capable of effecting five forward speeds including an overdrive and reverse including a gear shift lever and three shift rods, one controlling reverse and first speed, a second controlling second and third speeds, and a third controlling fourth speed and the overdrive, a shiftable member movable in one direction to complete said overdrive and in the other direction to effect fourth speed, a shift fork for said shiftable member slidably mounted on said one shift rod, a pivoted lever having a sliding pivotal connection with said shift fork, and a collar having a sliding pivotal connection with said lever and fixed to said third shift rod so that movement of the latter shifts said fork in an opposite direction on the first shift rod, whereby the gear shift lever is movable in an orderly progression from reverse through first to fifth speeds.

9. Gear shifting mechanism for a change speed gearing comprising selectively operated gear connections for effecting reverse drive and first, second, third and fifth speeds, and a slidable member to effect fourth speed, said gear shifting mechanism controlling said speed changes and including three slidably mounted shift rods, a gear shift lever for moving said rods, two of said rods being connected with the gear connections for reverse, first, second and third speeds, a shift fork connected with the slidable member and movably mounted independently of said third shift rod, and motion reversing means between the third shift rod and said shift fork, whereby the movements of said shift lever are progressively uniform from reverse through first to fifth speeds.

10. Gear shifting mechanism comprising a shift lever, a plurality of gear shifting rods having lugs adapted for selective engagement by said shift lever, gear shifting forks for the rods, one being fixedly secured to one of said shift rods and another fork movably mounted on one of the shift rods, and means including a lever having a fixed fulcrum and disposed transversely of said shift rods for connecting one of them with said movable shift fork to impart to the latter a motion different than the motion imparted to the shift rod connected thereto by said lever.

11. Gear shifting mechanism comprising a shift lever, a plurality of gear shifting rods having lugs adapted for selective engagement by said shift lever, gear shifting forks for the rods, one being movably mounted on one of the shift rods, a pivotally mounted lever disposed transversely of said shifting rods, means connecting one end of said transverse lever with one of said rods, and means connecting said movable fork with said transverse lever at a point spaced from the end thereof which is connected with the associated shifting rod, whereby actuation of the latter shifts the movable fork relatively to the shifting rod on which it is mounted.

ROBERT LAPSLEY.